US007973499B2

(12) United States Patent
Yoshioka

(10) Patent No.: US 7,973,499 B2
(45) Date of Patent: Jul. 5, 2011

(54) WORKING VEHICLE

(75) Inventor: Masao Yoshioka, Nagano (JP)

(73) Assignee: Takeuchi Mfg. Co., Ltd. (JP)

( * ) Notice: Subject to any disclaimer, the term of this patent is extended or adjusted under 35 U.S.C. 154(b) by 301 days.

(21) Appl. No.: 12/301,545

(22) PCT Filed: May 24, 2007

(86) PCT No.: PCT/JP2007/061033
§ 371 (c)(1),
(2), (4) Date: Nov. 19, 2008

(87) PCT Pub. No.: WO2007/139169
PCT Pub. Date: Dec. 6, 2007

(65) Prior Publication Data
US 2009/0261761 A1    Oct. 22, 2009

(30) Foreign Application Priority Data

Jun. 1, 2006 (JP) ................. 2006-153694
Jun. 1, 2006 (JP) ................. 2006-153695

(51) Int. Cl.
H02K 23/66 (2006.01)
H02J 7/00 (2006.01)
H02H 7/18 (2006.01)
(52) U.S. Cl. ........ 318/139; 318/434; 320/132; 320/134; 324/426; 340/636.1
(58) Field of Classification Search ............. 318/3, 139, 318/140, 432, 434, 798, 801; 180/65.24, 180/65.29, 312; 290/7, 4 R, 40 B, 40 C; 320/132, 134; 324/426, 429; 340/636.1
See application file for complete search history.

(56) References Cited

U.S. PATENT DOCUMENTS

| 5,563,479 A | 10/1996 | Suzuki |
| 6,329,772 B1 * | 12/2001 | Ochiai et al. ................. 318/139 |
| 6,864,663 B2 * | 3/2005 | Komiyama et al. ........... 320/104 |

(Continued)

FOREIGN PATENT DOCUMENTS

EP    1151892 A2    7/2001

(Continued)

OTHER PUBLICATIONS

International Search Report for International Appln. PCT/JP2007/061033, dated Aug. 2, 2007.

Primary Examiner — Eduardo Colon-Santana
(74) Attorney, Agent, or Firm — Studebaker & Brackett PC; Donald R. Studebaker

(57) ABSTRACT

A crawler type power shovel vehicle (1) operated by a hydraulic actuator (20), constructed from an electric motor (31) for driving a hydraulic pump (32) for supplying hydraulic oil to the hydraulic actuator (20), a battery (50) for supplying direct current power, an inverter (41) for operating the electric motor (31) by converting the direct current power into alternating current power and supplying it to the motor, a controller (40) for causing the inverter (41) to control operation of the electric motor (31), and a voltage/current sensor (42) for detecting the magnitude of a load current flowing from the battery (50) into the inverter (41). The controller (40) stops the motor (31) when the magnitude of the load current detected by the voltage/current sensor (42) continuously exceeds a predetermined threshold for a predetermined time period.

4 Claims, 11 Drawing Sheets

U.S. PATENT DOCUMENTS

| | | | |
|---|---|---|---|
| 2001/0041952 A1 | 11/2001 | Nada | |
| 2005/0266303 A1* | 12/2005 | Kadouchi et al. | 429/92 |
| 2007/0187180 A1* | 8/2007 | Kagoshima et al. | 182/232 |
| 2009/0173554 A1* | 7/2009 | Yoshioka | 180/65.8 |

FOREIGN PATENT DOCUMENTS

| | | |
|---|---|---|
| JP | 07-039001 | 2/1995 |
| JP | 07-231511 | 8/1995 |
| JP | 10-084628 | 3/1998 |
| JP | 2001-320807 | 11/2001 |
| JP | 2004011256 A * | 1/2004 |
| JP | 2004-169464 | 6/2004 |
| JP | 2004-225355 | 8/2004 |
| WO | WO 2005081393 A1 * | 9/2005 |

* cited by examiner

WORKING VEHICLE

TECHNICAL FIELD

The present invention relates to a working vehicle having an electric motor driven by a battery as the drive power source, and more particularly relates to a working vehicle that operates by hydraulic oil supplied by a hydraulic pump driven by the electric motor.

TECHNICAL BACKGROUND

In conventional working vehicles the drive power source is normally an engine. However, in circumstances in which an engine cannot be used, such as in an underground construction site, construction machinery with an electric motor as the power source is used (see for example Japanese Patent Application Laid-open No. 2004-225355). The power sources for these electric motors are a commercial power supply, or batteries on the construction machinery that are charged from a commercial power supply. Also, the operation of this type of electric motor is controlled using an inverter.

DISCLOSURE OF THE INVENTION

Problems to be Solved by the Invention

However, when a load is applied to the electric motor, the load current from the battery into the inverter increases, but if an overload situation is continuous, an excess current flows in the inverter, which causes heating, so the inverter protective circuit (protective means for preventing damage to the internal circuits due to heating) is activated and the motor stops. When the inverter is stopped due to heating, it is not possible to restart the inverter until the temperature has fallen below a predetermined threshold, and as a result there is the problem that there are times when the working vehicle cannot be used.

Also, in this type of working vehicle, the controller is also operated by electric power from the battery, so if a fault arises in the battery so that the battery cannot supply electric power, the whole working vehicle stops. Hence, the problem arises that it is not possible to warn the operator that there is a fault in the battery.

It is an object of the present invention to provide a working vehicle that stops the operation of the electric motor when it is detected that an excess current has continuously flowed in the inverter for a predetermined period of time.

It is also an object of the present invention to provide a working vehicle in which even if a fault occurs in the battery, it is possible to provide a warning of the fault.

Means to Solve the Problems and Advantageous Effects of the Invention

To solve the above problems, the working vehicle according to the present invention (for example, the crawler type power shovel 1 according to the embodiments) is a working vehicle operated by a hydraulic actuator, comprising: a hydraulic pump that supplies hydraulic oil to a hydraulic actuator; an electric motor that drives the hydraulic pump; a battery that supplies direct current electric power; an inverter that drives the electric motor by converting the direct current electric power of the battery to alternating current electric power and supplies the alternating current electric power to the electric motor; a controller that controls the operation of the electric motor by the inverter; and a current sensor (for example, the voltage or current sensor 42 in the embodiments) that measures the magnitude of the load current flowing from the battery to the inverter wherein the controller stops electric motor when the magnitude of the load current measured by the current sensor exceeds a predetermined threshold value for a predetermined continuous period of time.

When the working vehicle according to the present invention is constituted as described above, even if a large load is applied to the electric motor and the inverter heats due to excess current, before the protective circuit of the inverter operates, in other words, before the inverter reaches a high temperature state and stops, the operation of the electric motor is stopped by the controller, so it is possible to immediately restart work using the working vehicle, and work efficiency is improved.

In addition to the above constitution, the present invention further includes an electric motor relay (for example, the second relay 147 in the embodiments) that makes and breaks the connection between the battery (this is also called the main battery) and the inverter; a controller which is operated by direct current electric power from the main battery, and which controls the operation of the hydraulic actuator and the inverter, and makes and breaks the connection between the main battery and the inverter in use of the electric motor relay; a controller relay (for example, the first relay 146 in the embodiments) that makes and breaks the connection between the main battery and the controller; a power source monitoring controller that monitors the state of the main battery and that makes and breaks the connection between the main battery and the controller in use of the controller relay; a backup battery that supplies electric power to the power source monitoring controller; and a key switch that makes and breaks the connection between the power source monitoring controller and the backup battery. Then, in the working vehicle, configuration is employed to execute: when the power source monitoring controller and the backup battery are connected by the key switch and the power source monitoring controller is operating, a first step in which the power source monitoring controller obtains the state of the main battery and determines whether the main battery can be used or not; a second step in which the power source monitoring controller connects the main battery and the controller in use of the controller relay and starts up the controller when judgment is made in the first step that the main battery can be used; and a third step in which the controller starts the electric motor by connecting the inverter and the main battery in use of the electric motor relay.

Preferably this type of working vehicle according to the present invention has a protective circuit that obtains the status of the main battery, and in the first step, the power source monitoring controller supplies electric power to the protective circuit from the backup battery and starts up the protective circuit, and then obtains the status of the main battery from the protective circuit.

Also preferably this type of working vehicle according to the present invention has warning means (for example, the warning pilot lamp 152 in the embodiments) for warning that the main battery cannot be used, and in the first step, when determination is made that the main battery cannot be used, the power source monitoring controller issues a warning by the warning means.

Further, preferably this type of working vehicle according to the present invention has a DC-DC converter for converting the direct current voltage of the main battery to the voltage for operating the power source monitoring controller, and the controller relay connects the main battery and the controller and Connects the output of the DC-DC converter to the backup battery and the power source monitoring controller.

When the working vehicle according to the present invention is constituted as described above, by providing the power source monitoring controller that controls the supply of electric power to the inverter separately from the controller, monitors the main battery, as well as controls the supply of electric power to the controller, and the backup battery that allows the power source monitoring controller to operate even when electric power is not supplied from the main battery in this way, even if a fault arises in the main battery, all processes are not stopped. For example, the fault is detected by the power source monitoring controller and it is possible to provide a warning using the warning means, so it is possible to make the operator that is operating the power shovel immediately aware of the fault in the main battery.

Also, the process when electric power is turned on is capable of turning on the power supply in turn starting with the power source monitoring controller, so it is possible to simplify the process and constitution of the power source monitoring controller and the controller.

Further, when electric power is supplied to the controller when the main battery is in the normal state, and at the same time the power source monitoring controller is operated by the main battery and the backup battery is charged, if a fault arises in the main battery, the power source monitoring controller can be operated by the backup battery.

BRIEF DESCRIPTION OF THE DRAWINGS

FIG. 8 is an explanatory diagram showing the control state of the degree of opening of the control valve when the electric motor speed is varied due to the load or the like;

DESCRIPTION OF THE PREFERRED EMBODIMENTS

The following is an explanation of the preferred embodiments of the present invention with reference to the drawings.

Figure 1:
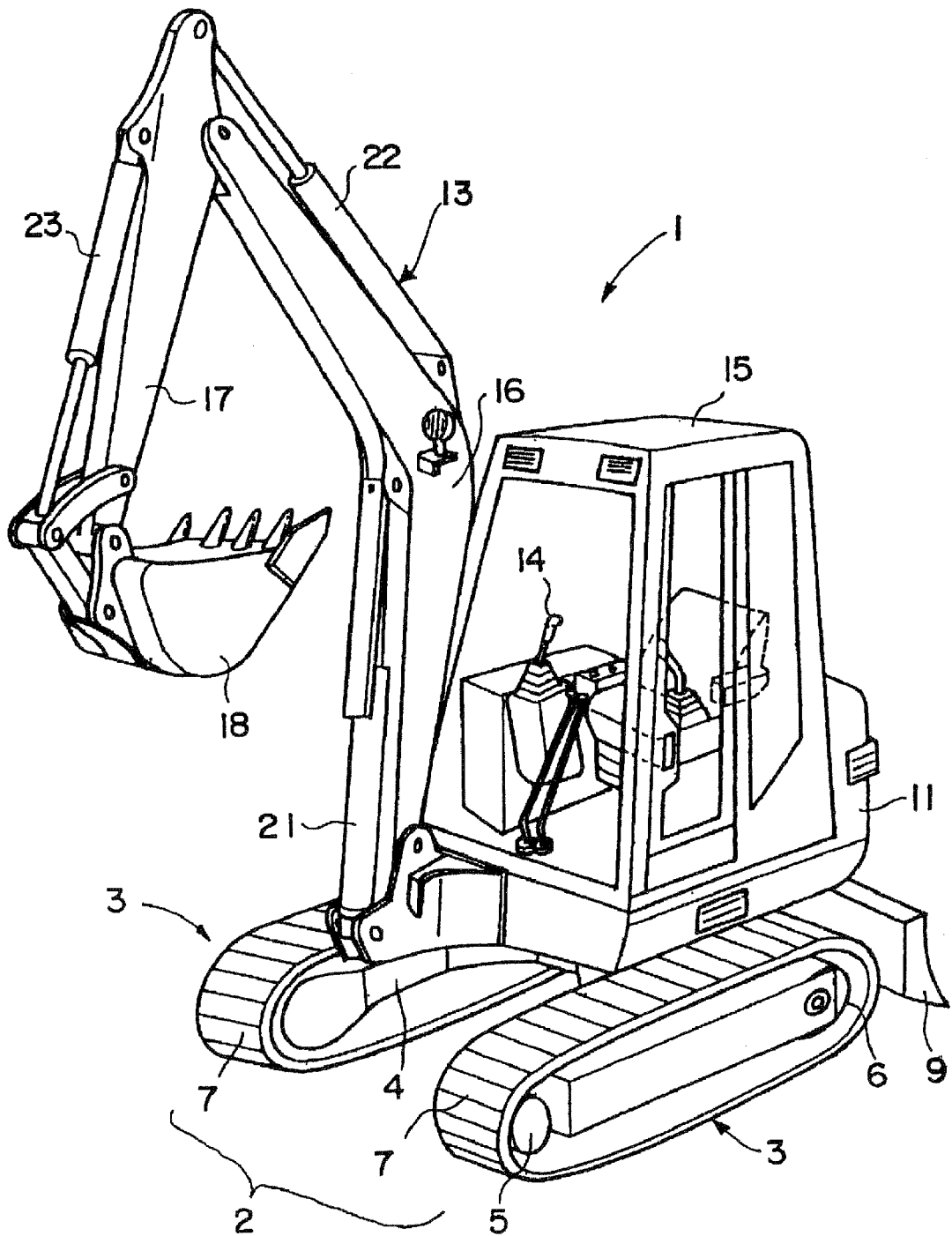
FIG. 1 is a perspective diagram showing the constitution of a crawler type power shovel as an example of a working vehicle according to the present invention.

First, a crawler type power shovel 1 is explained as an example of a working vehicle according to the present invention, using FIG. 1. This power shovel 1 is intended to be used in comparatively enclosed spaces such as underground and the like, and operates by using electrical power from a battery. The power shovel 1 includes a travel bogey 4 that forms a travel device 2, a blade 9 provided to the rear of the travel bogey 4 that is capable of swiveling vertically, a rotation platform 11 that is capable of rotating provided above the travel bogey 4, a power shovel mechanism 13 swivelably connected to the front of the rotation platform 11, and an operator's cabin 15 provided above the rotation platform 11.

The travel device 2 includes the approximately H-shaped travel bogey 4, and a travel mechanism 3 provided on the left and right of the travel bogey 4. The travel mechanism 3 includes a drive sprocket wheel 5 provided to the front and an idler wheel 6 (on occasions the drive sprocket wheel 5 and the idler wheel 6 will be referred to collectively as the "crawler wheels") provided to the rear on the left and right of the travel bogey 4, and a pair of left and right crawler tracks 7 wound around the two wheels 5, 6. Each of the drive sprocket wheels 5 is driven by left and right drive motors (hydraulic motors), which are not shown on the drawings, so that the power shovel 1 can move. Also, the rotation platform 11 can be rotated relative to the travel bogey 4 by a rotation motor (hydraulic motor), which is not shown on the drawings.

Figure 2:
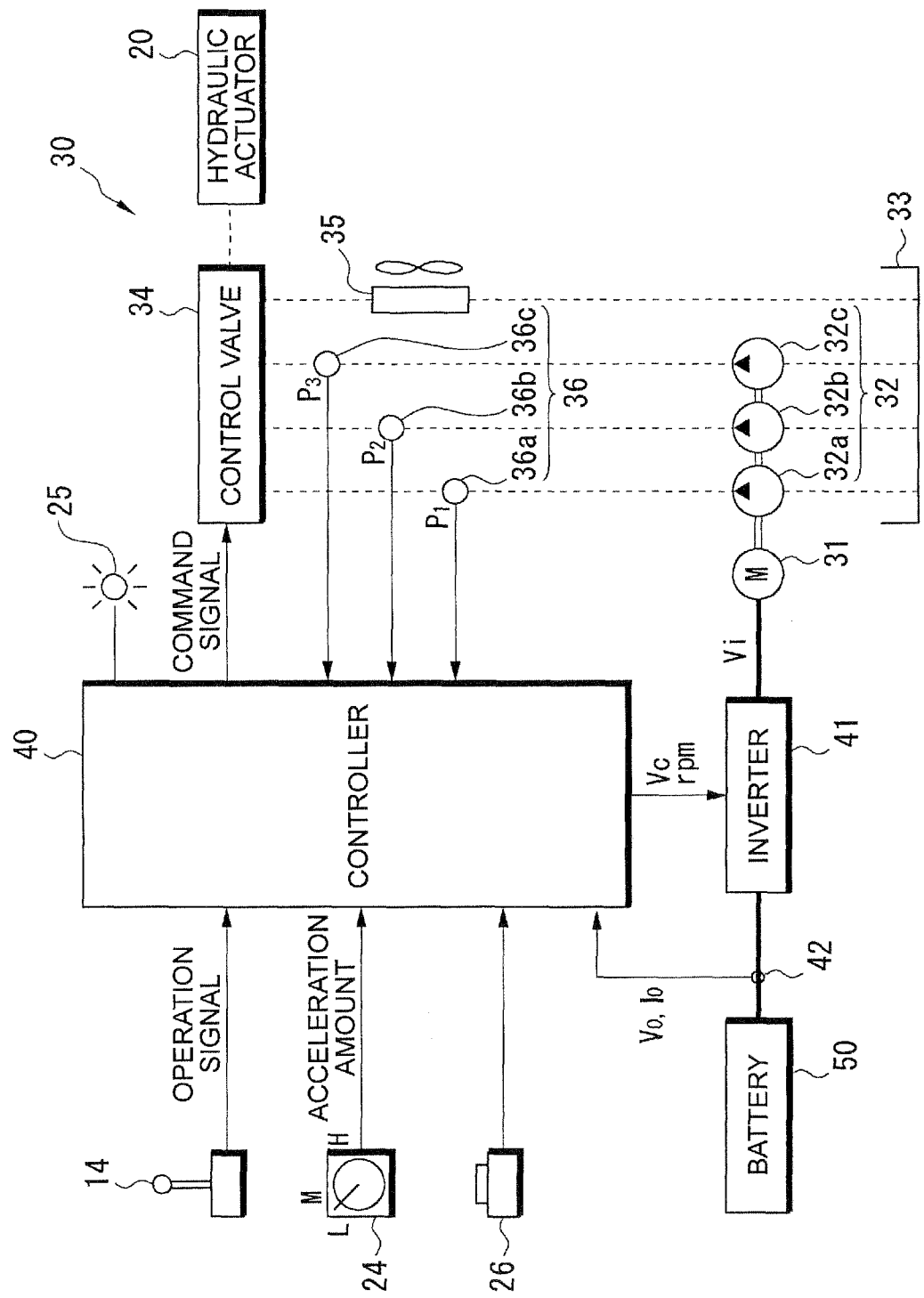
FIG. 2 is a block diagram showing the constitution of the hydraulic unit and power supply unit in the power shovel.

The power shovel mechanism 13 includes a boom 16 swivelably connected to the front of the rotation platform 11 so that the boom 16 can be freely raised and lowered, an arm 17 swivelably connected to the top of the boom 16 so that the arm 17 can be freely swiveled vertically in the plane of vertical movement of the boom 16, and a bucket 18 connected to the top of the arm 17 so that the bucket 18 can be freely swiveled. The boom 16 is raised and lowered by a boom cylinder 21, the arm 17 is swiveled by an arm cylinder 22, and the bucket 18 is swiveled by a bucket cylinder 23. The cylinders and the drive motors referred to above and the rotation motor are driven by hydraulic oil supplied from a hydraulic unit 30, as shown in FIG. 2, so in the following explanation, these are collectively referred to as the "hydraulic actuator 20". Also, operation of the power shovel mechanism 13 is carried out using an operating device 14 provided within the operator's cabin 15.

The hydraulic unit 30 includes an electric motor 31, a hydraulic pump 32 that is driven by the electric motor 31 and that outputs hydraulic oil at a specific oil pressure and flow rate, a tank 33 in which hydraulic oil accumulates, a control valve (electromagnetic proportional valve) 34 that controls the supply of hydraulic oil output from the hydraulic pump 32 to the hydraulic actuator 20 in a supply direction and supply flow rate in accordance with the manipulation of the operating device 14, and an oil cooler 35 that cools the hydraulic oil whose temperature has risen. Operation signals output from the operating device 14 are input to a controller 40, which is described later, and the controller 40 outputs command signals to the control valve 34 in accordance with the operation signals so that the operation of control valve 34 is controlled.

In the present embodiment, the hydraulic pump 32 includes three pumps 32a through 32c, and the three pumps 32a through 32c are driven simultaneously by the electric motor 31. For example, the first pump 32a supplies hydraulic oil to the actuator that drives the sprocket wheel 5 for driving right and the boom cylinder 21 that drives the boom 16, the second pump 32b supplies hydraulic oil to the actuator that drives the sprocket wheel 5 for driving left, the arm cylinder 22 that drives the arm 17, and the bucket cylinder 23 that drives the bucket 18, and the third pump 32c supplies hydraulic oil to the rotation motor that rotates the rotation platform 11 and the actuator that drives the blade 9. Also direct current electric power supplied from a battery 50 is converted into alternating current electric power having a predetermined voltage and frequency by an inverter 41 and supplied to drive the electric motor 31. An interior permanent magnet (IPM) motor or the like, for example, may be used as the electric motor 31.

In this way, the power shovel 1 is driven using hydraulic oil supplied by controlling the control valve 34 and the inverter 41, whose operation is controlled by the controller 40. In order to control the control valve 34 and the inverter 41, the output hydraulic pressure of the pumps 32a through 32c that constitutes the hydraulic pump 32 is measured using hydraulic sensors 36 (36a through 36c), and the measurement values are input to the controller 40. Also, a voltage and current sensor 42 is provided between the battery 50 and the inverter 41 to measure the output voltage Vo of the battery 50 and the load current Io flowing into the inverter 41, and the measurement values are input to the controller 40. Also, an acceleration setting switch 24 is provided in the operator's cabin 15, in order that the operator can set the value of the voltage (hereinafter referred to as the "acceleration amount (power level)" applied to the electric motor 31 from the inverter 41, and the setting value is input to the controller 40.

Next, control of the electric motor 31 by the controller 40 is explained. As described above, operation signals are output from the operating device 14 in accordance with the amount of manipulation of the operating device 14, the controller 40 outputs command signals to the control valve 34 in accordance with the operation signals, and controls the operation of the hydraulic actuator 20. Therefore, when hydraulic oil is supplied to the hydraulic actuator 20 to drive the power shovel 1, the electric motor 31 is rotated at high speed to supply hydraulic oil from the hydraulic pump 32, and conversely, when the hydraulic actuator 20 is stopped, the electric motor 31 is rotated at low speed to reduce the electric power consumption of the battery 50.

Figure 3:
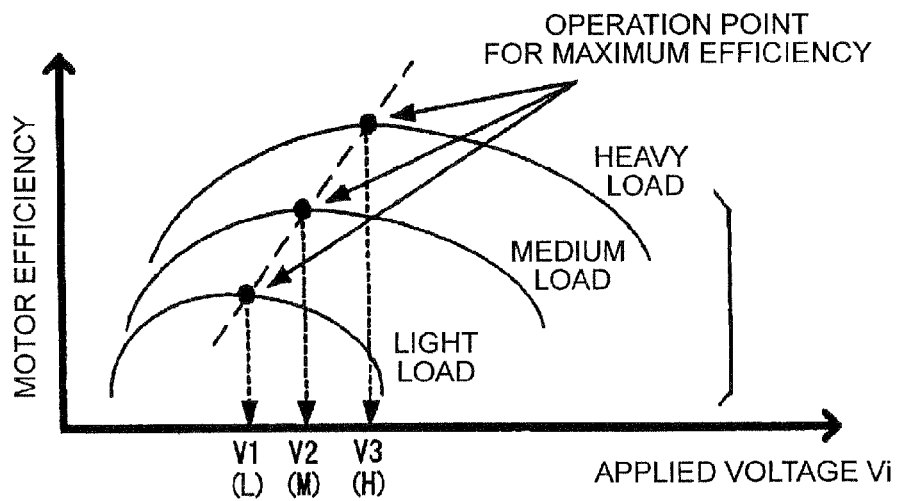
FIG. 3 is a graph showing the relationship between the voltage applied to the electric motor and the electric motor efficiency.

As shown in FIG. 3, the relationship between the voltage Vi applied to the electric motor 31 and the motor efficiency varies in accordance with the size of the load applied to the electric motor 31, so in the present embodiment, the operator can select the acceleration amount (value of voltage applied to the electric motor 31) in three stages (L, M, H) using the acceleration setting switch 24, in accordance with the operating conditions of the power shovel 1. In other words, it is possible to operate the electric motor 31 at the acceleration amount L near the applied voltage $V_1$ where the efficiency of the motor is best under light loads, operate the electric motor 31 at the acceleration amount M near the applied voltage $V_2$ where the efficiency of the motor is best under medium loads, and operate the electric motor 31 at the acceleration amount H near the applied voltage $V_3$ where the efficiency of the motor is best under heavy loads.

Figure 4:
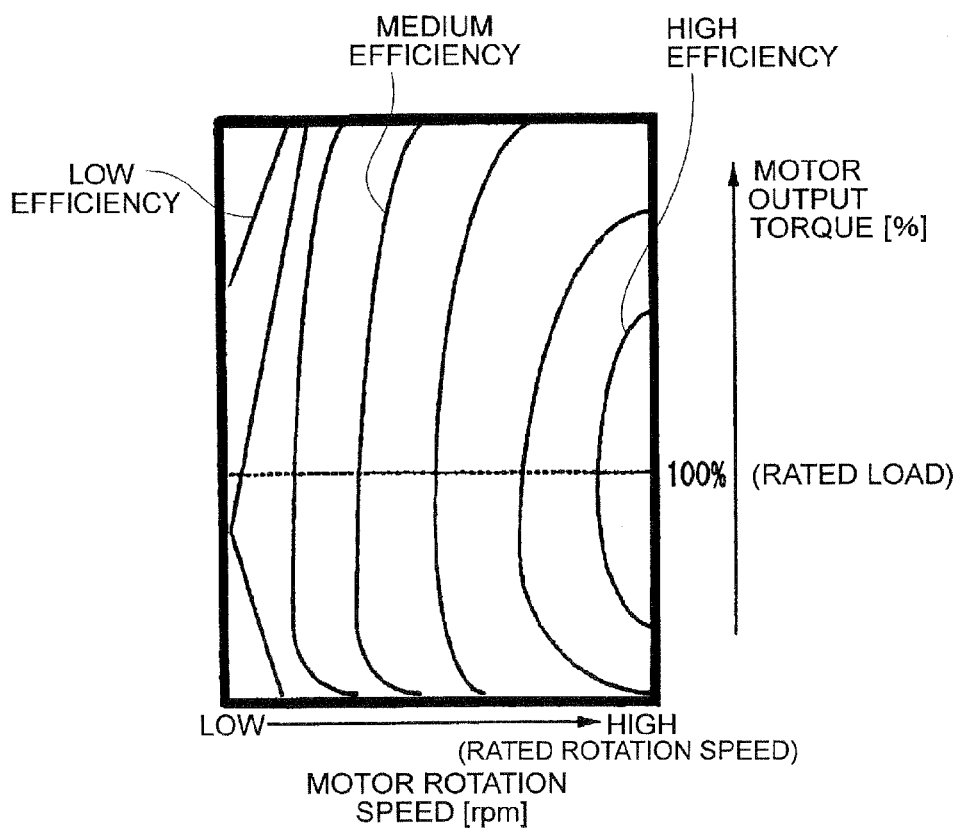
FIG. 4 is a graph showing the motor rotation speed and the motor efficiency determined from the motor output torque.

On the other hand, if the relationship between the rotation speed of the electric motor 31 and load (output torque) is examined, as shown in FIG. 4, it can be seen that when the rotation speed is low the efficiency of the electric motor 31 is poor, and when the rotation speed is high the efficiency is good. In particular, the electric motor 31 has the characteristic that at the rated load (output torque 100%), the efficiency is best at the rated rotation speed. Therefore, as shown in FIG. 5, the controller 40 sets the minimum rotation speed $R_L$, $R_M$, $R_H$ of the electric motor 31 in accordance with the acceleration amount (L, M, H) selected using the acceleration setting switch 24, to increase the rotation speed in accordance with the fluctuation in the load of the electric motor 31 (fluctuation in load current Io) (in the following explanation this increase in rotation speed is referred to as the "acceleration amount $\Delta R_L$, $\Delta R_M$, $\Delta R_H$").

Also, when there is no load (when the operating device 14 is not outputting an operation signal), even though the electric motor 31 does not rotate at high speed where the efficiency is good, by operating at low rotation speed where the load current Io is reduced it is possible to reduce the electric power consumption of the battery 50. Therefore regardless of the acceleration that has been selected using the acceleration setting switch 24, if the controller 40 determines that a state of no manipulation has continued for a predetermined period of time, the electric motor 31 is controlled (the inverter 41 is commanded to output the idling rotation speed $R_I$) to rotate at the idling rotation speed $R_I$ (where $R_I < R_L < R_M < R_H$). Of course, if the operating device 14 is manipulated in this state, the minimum rotation speeds $R_L$, $R_M$, $R_H$ and acceleration amounts $\Delta R_L$, $\Delta R_M$, $\Delta R_H$ are specified to the inverter 41.

Figure 5:
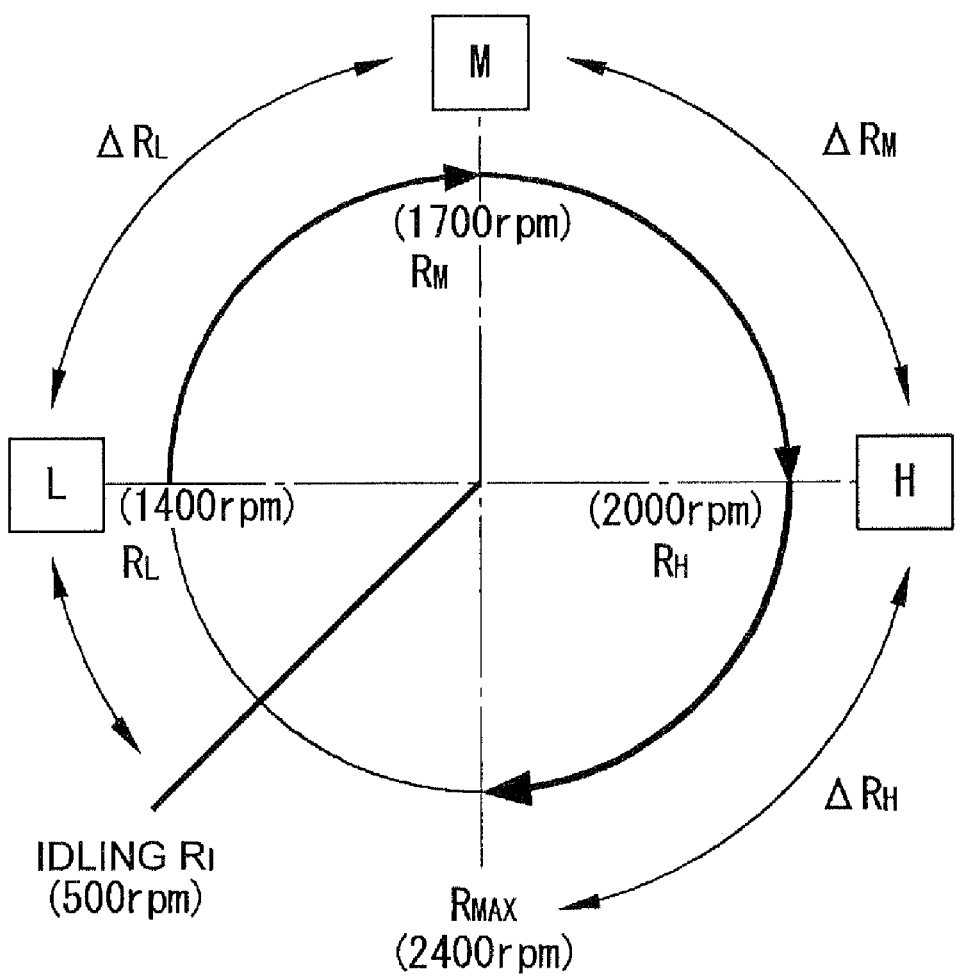
FIG. 5 is an explanatory diagram showing the relationship between the acceleration amount and the rotation speed of the electric motor.

For example, in the case of FIG. 5, $R_{MAX}$ of the electric motor 31 is 2400 rpm, the minimum rotation speed $R_L$ in L mode is 1400 rpm, the minimum rotation speed $R_M$ in M mode is 1700 rpm, the minimum rotation speed $R_H$ in H mode is 2000 rpm, and the idling rotation speed $R_I$ is 500 rpm. When in L mode, the acceleration amount $\Delta R_L$ is controlled so that the rotation speed of the electric motor 31 does not exceed the minimum rotation speed $R_M$ in M mode, and when in M mode the acceleration amount $\Delta R_M$ is controlled so as not to exceed the minimum rotation speed $R_H$ when in H mode, and when in H mode the acceleration amount $\Delta R_H$ is controlled so that $R_{MAX}$ is not exceeded.

Figure 6:
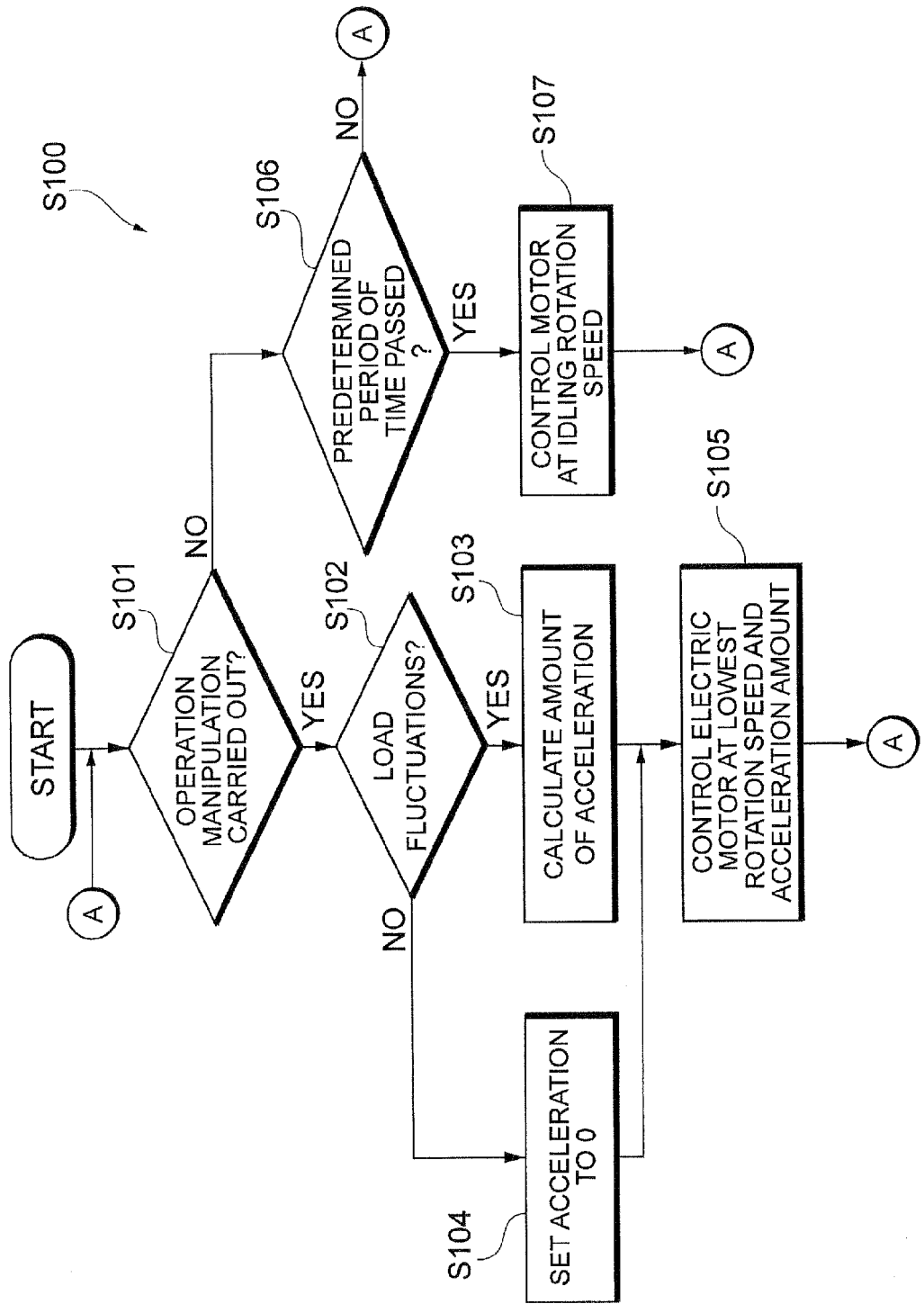
FIG. 6 is a flowchart showing the motor control process executed by the controller for saving electric power.

Next, control of the operation of the electric motor 31 using the controller 40 is explained using FIG. 6. The controller 40 issues commands specifying the rotation speed and the applied voltage of the electric motor and 31 to the inverter 41, and the inverter 41 controls the operation of supplying electric motor 31 with alternating current electric power based on the values of these commands. Also, in FIG. 6, the symbol A enclosed within a circle appearing after steps S105, S106, and S107, means go to the symbol A enclosed in a circle immediately after the start.

When the main switch of the power shovel 1 is turned on and the power shovel 1 starts, the controller 40 starts the motor control S100. In the motor control S100, the controller 40 first monitors for operation signals output from the operating device 14, and determines whether there has been operation manipulation or not (S101). When it is determined in step S101 that operation manipulation has been carried out, the controller 40 next monitors the load current Io, and determines whether there has been a load fluctuation or not (S102), when it is determined that there has been a load fluctuation, the acceleration amount is calculated in accordance with the selected acceleration amount and the result is set (S103), when it is determined that there has been no load fluctuation the acceleration amount is set to zero (S104). Then the controller 40 instructs the inverter 41 to set the rotation speed of the electric motor 31 to the sum of the set acceleration amount ($\Delta R_L$, $\Delta R_M$, or $\Delta R_H$) and the minimum rotation speed ($R_L$, $R_M$, or $R_H$) in accordance with the acceleration amount, and the value of the voltage corresponding to the set acceleration amount as the value of voltage applied to the electric motor 31 (step S105), and the procedure returns to step S101.

On the other hand, when it is determined in step S101 that operation manipulation has not been carried out, the controller 40 determines whether there has been a predetermined continuous period of time with no operation (step S106). When it has been determined in step S106 that there has been a predetermined continuous period of time with no operation manipulation, the controller 40 sets the rotation speed of the electric motor 31 to the idling rotation speed $R_I$, and instructs the inverter 41 to set the value of voltage applied to the electric motor 31 to the value of voltage in accordance with the set acceleration amount (step S107), the procedure returns to step S101, and when it determined that the state of no operation manipulation has not continued for the predetermined period of time, the procedure returns as it is to step S101.

Here, in the method of calculating the acceleration amounts $\Delta R_L$, $\Delta R_M$, $\Delta R_H$ in step S103, the current set acceleration amount (L, M, H), the output oil pressure P1 through P3 from the first through third pumps 32a through 32c, the load current Io flowing in the inverter 41, and battery 50 output voltage Vo are used as parameters in the calculation. The calculated acceleration amount may be obtained in accordance with these parameters from a table set in advance in the controller 40, or by inserting these parameters into a predetermined calculation equation in the controller 40.

In this way, when the state of no operation manipulation has continued for a predetermined period of time, it is not necessary to supply hydraulic oil from the hydraulic pump 32 to the hydraulic actuator 20, so it is possible to reduce the consumption of electric power of the battery 50 by running the electric motor 31 at the idling rotation speed $R_I$ which is lower than during normal operation. Also, the acceleration amount can be set using the acceleration setting switch 24 in accordance with the load applied to the electric motor 31, so it is possible to operate the electric motor 31 with good efficiency, and electric power of the battery 50 can be effectively used. The response speed of the electric motor 31 is very high compared with an engine, and it is possible to determine the load applied to the electric motor 31 from the load current and control the rotation speed to the optimum rotation speed by the controller 40. Therefore, even though in real time the rotation speed of the electric motor 31 fluctuates, the response speed is fast so the fluctuation of the hydraulic pressure of the hydraulic pump 32 is virtually unnoticed.

Figure 7:
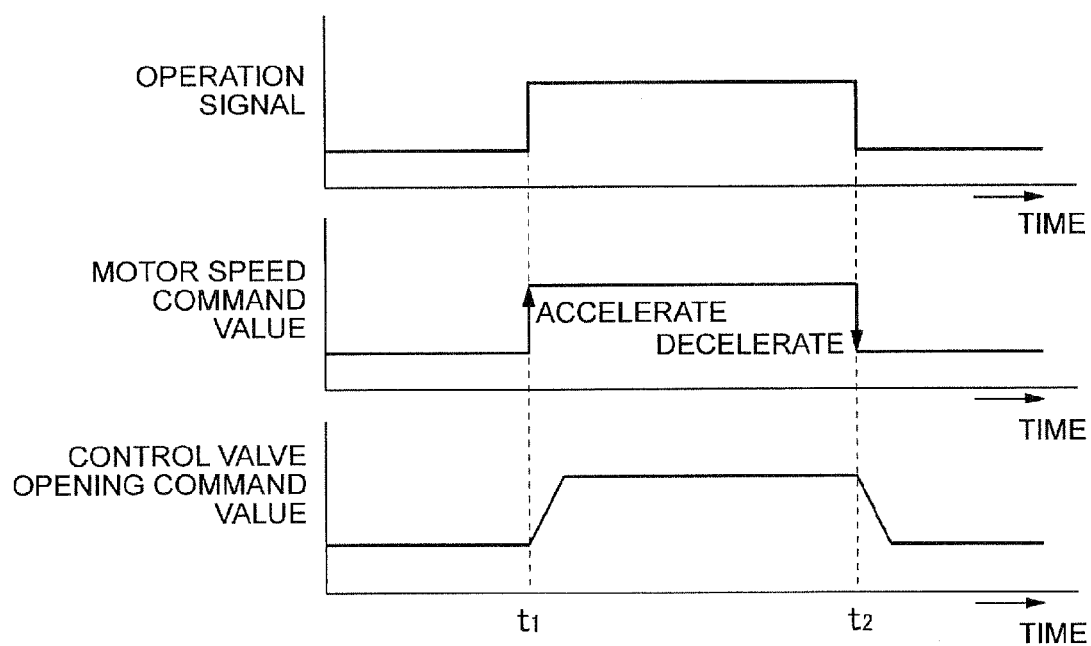
FIG. 7 is an explanatory diagram showing the control state of the electric motor speed and the degree of opening of the control valve when the operating device is manipulated.

When the controller 40 controls the opening of the control valve 34 in accordance with the manipulation of the operating device 14, at the same time the rotation speed of the electric motor 31 is controlled to either accelerate or decelerate. For example, as shown in FIG. 7, when the power shovel 1 is traveling, if the operating device 14 is operated at the time $t_1$ to accelerate and that the time $t_2$ to decelerate, the controller 40 controls both the control valve 34 (the control valve that supplies hydraulic oil to the travel motor) and the electric motor 31. In other words, hydraulic oil is applied to the hydraulic actuator 20 in accordance with the acceleration or deceleration manipulation of the power shovel 1, and in addition the hydraulic oil necessary for this operation is supplied from the hydraulic pump 32. In the case of FIG. 7, when the operation signal from the operating device 14 is increased in the acceleration side (time $t_1$), the controller 40 increases the degree of opening of the control valve 34, and at the same time the rotation speed of the electric motor 31 is increased and the supply of hydraulic oil is increased. Also, when the operation signal from the operating device 14 is reduced to the deceleration side (time $t_2$), the degree of opening of the control valve 34 is reduced, and at the same time the rotation speed of the electric motor 31 is reduced and the supply of hydraulic oil is reduced.

When the electric motor 31 and the control valve 34 are operated at the same time in this way, if the degree of opening of the control valve 34 is varied in a stepwise matter, the power shovel 1 may suddenly accelerate or decelerate, so the operability will be poor. Therefore, in the present embodiment, when the electric motor 31 is accelerated or decelerated and the degree of opening of the control valve 34 is varied simultaneously (for example, the time $t_1$ and $t_2$ in FIG. 7), the opening or closing operation of the control valve 34 is output as a ramp, and controlled by the controller 40 to open or close in a predetermined period of time. In this way the fluctuation in the hydraulic oil supply to the hydraulic actuator 20 is made gentle, and it is possible to prevent sudden fluctuations in operation.

Figure 8:
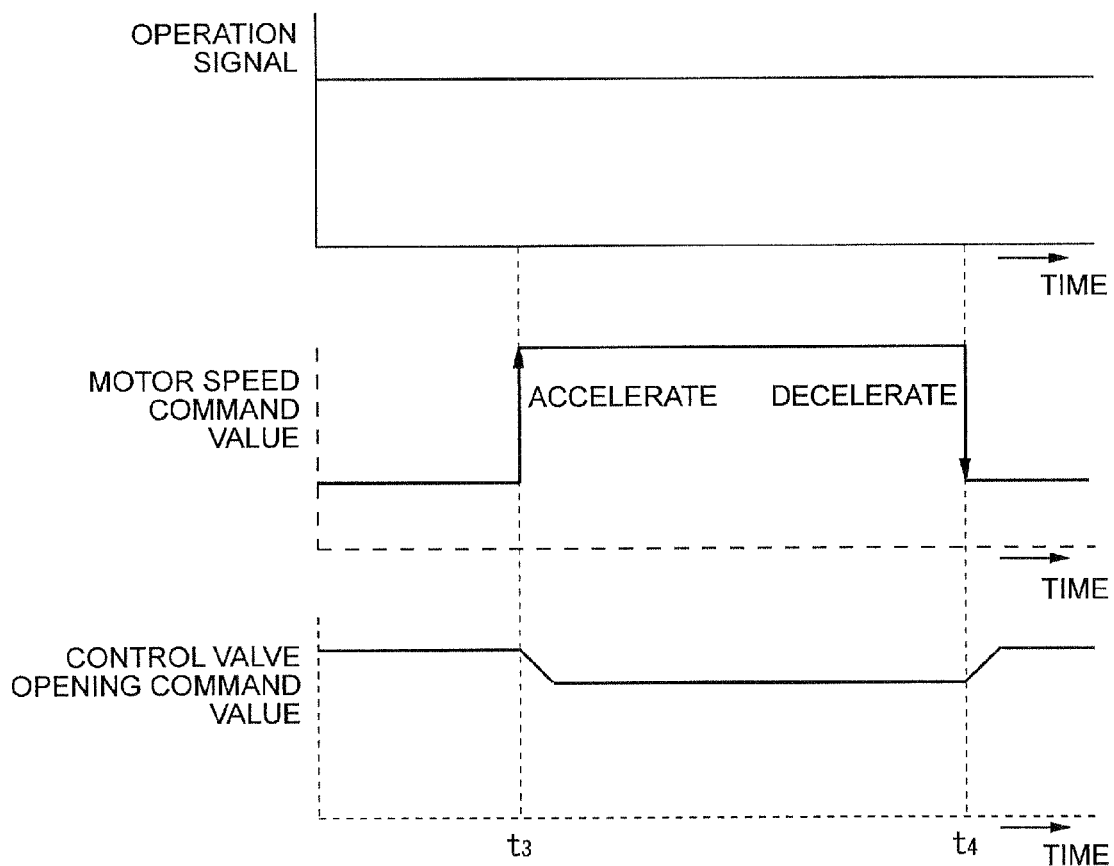

On the other hand, when there is no variation in the amount of manipulation of the operating device 14, as shown in FIG. 8, the degree of opening of the control valve 34 is not varied, but when the speed of the electric motor 31 is increased or decreased due to load fluctuations or the like, the output oil pressure increases or decreases in accordance with the increase or decrease in the speed of the electric motor 31, and the speed of the hydraulic actuator 20 may also increase or decrease. For example, when the power shovel 1 is traveling at a fixed speed and enters a part where the road surface is bad, the load current Io flowing in the electric motor 31 may increase. In this case the controller 40 causes the rotation speed of the electric motor 31 to increase and increase the supply of hydraulic oil (the time $t_3$ in FIG. 8), but at the same time by reducing the degree of opening of the control valve 34 by a specific amount, the increase in the output of hydraulic oil is controlled so that it does not affect the operation of the hydraulic actuator 20. In the same way, when a part where the road condition is good is entered, the rotation speed of the electric motor 31 is reduced corresponding to the reduction in the load current Io, and the supply of hydraulic oil is reduced (time t4 in FIG. 8), by increasing the degree of opening of the control valve 34 by just a specific amount, the controller 40 controls the reduction in output flow rate of hydraulic oil so as to not affect the operation of the hydraulic actuator 20. In this way, the variation in the quantity of hydraulic oil output from the hydraulic pump 32 due to the variation in the rotation speed of the electric motor 31 is prevented from affecting the operation of the hydraulic actuator 20, so it is possible to improve the operability of the power shovel 1.

In the power shovel 1, when a load is applied to the electric motor 31 the load current Io flowing in the inverter 41 increases. When the battery 50 is well charged the fluctuation in the output voltage Vo is small even if the load current Io is increased, but if the battery 50 is not well charged when the load current Io increases the fluctuation (the amount of reduction of the output voltage Vo) in the output voltage Vo becomes larger. If a large variation in the voltage of the battery 50 occurs, there is a danger that the torque of the electric motor 31 would be reduced resulting in unevenness of rotation. Also, if there is a large reduction in the output voltage Vo of the battery 50, there is a danger that it will be determined that the inverter 41 has stopped and the output to the electric motor 31 will be cut off.

Therefore, the controller 40 monitors the output voltage Vo of the battery 50, and when the output voltage Vo falls below a predetermined threshold, the load applied to the electric motor 31 is reduced to stabilize the output voltage Vo of the battery 50. For example, if the rotation speed being specified for a electric motor 31 is low, a command to increase the rotation speed is output to the inverter 41, and the rotation speed of the electric motor 31 is increased. In this way, the load current Io flowing in the inverter 41 is reduced, so the variation in the output voltage Vo can also be reduced. Also, when the rotation speed being specified for the electric motor 31 is high, the degree of opening of the control valve 34 is reduced, so the load on the hydraulic pump 32 is reduced. In this way, the load on the electric motor 31 is reduced, and as a result the load current Io is reduced, and the variation in the output voltage Vo can also be reduced.

As explained above, in the power shovel 1 according to the present embodiment, the operator sets the acceleration amount, in other words, sets the value of voltage applied to the electric motor 31 using the acceleration setting switch 24. Also, in the power shovel 1, the inverter 41 applies a voltage to the electric motor 31 in accordance with the voltage value commanded by the controller 40, and controls the electric motor 31 until the rotation speed is the rotation speed commanded by the controller 40. Therefore, when for example traveling with the acceleration amount L selected, if a spin turn or a pivot turn is carried out, the load applied to the electric motor 31 is increased, and an excess current flows in the inverter 41 in order to maintain the rotation speed of the electric motor 31. When the state in which an excess current is flowing in the inverter 41 continues, the inverter 41 heats, and when the temperature of the inverter 41 exceeds a predetermined temperature a protective circuit operates and the inverter 41 is stopped, and as a result it is not possible to operate the power shovel 1.

Figure 9:
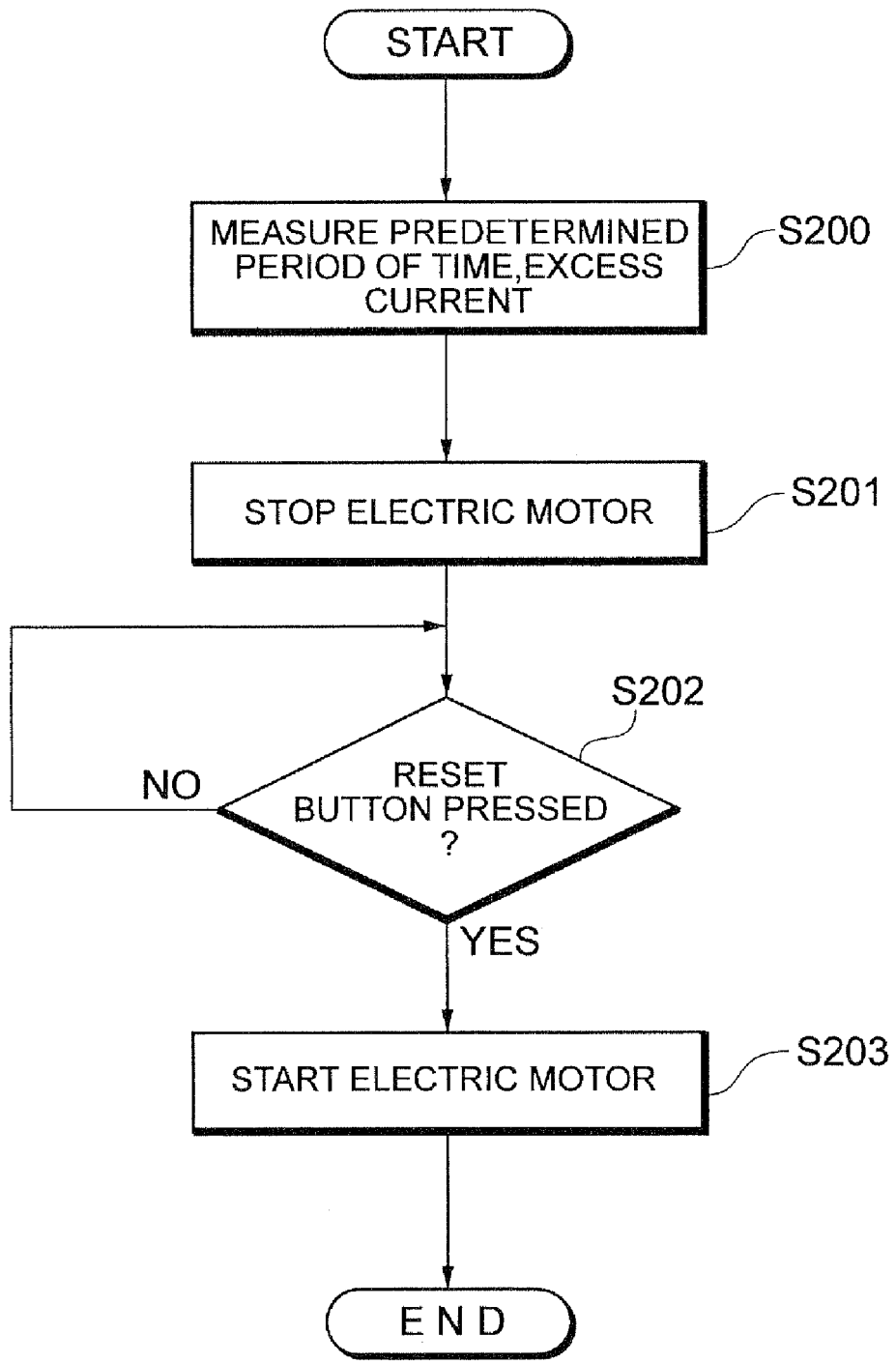
FIG. 9 is a flowchart showing the excess current prevention process executed by the controller.

Therefore, in the power shovel 1 according to the present embodiment, the load current Io is monitored by the controller 40, and controlled so that the temperature does not rise to the temperature at which the protective circuit of the inverter 41 operates. As shown in FIG. 9, the control by the controller 40 monitors the output current Io and when it is detected that an excess current state has continued for a predetermined period of time (S200), the inverter 41 is controlled to stop the electric motor 31, and a warning pilot lamp 25 provided within the operator's cabin 15 is lit, to warn the operator that the electric motor 31 has been stopped because of an excess current (S201). A reset button 26 is provided within the operator's cabin 15, and when the electric motor 31 has been stopped, the controller 40 waits for the reset button 26 to be pressed (S202). Then when it is detected that the reset button 26 has been pressed by the operator, the electric motor 31 is restarted by the inverter 41 so it is possible to operate the power shovel 1 (S203). In this state, if the same operation (for example, spin turn or pivot turn) is carried out as that which was carried out when the power shovel 1 was stopped as a result of the excess current, an excess current will flow in the same way and the electric motor 31 with be stopped, so it is necessary for the operator to select an acceleration amount (M or H) greater than that currently set by using the acceleration setting switch 24.

In this way, the load current Io flowing in the inverter 41 is monitored by the controller 40, and when the state of excess current has continued for a predetermined period of time, the electric motor 31 is stopped, so stoppage caused by heating of the inverter 41 is prevented even when the acceleration setting switch 24 is incorrectly set, or excess current is flowing in the inverter 41, and by operating the reset button 26, it is possible to immediately continue (restart) operation of the power shovel 1.

Second Embodiment

Figure 10:
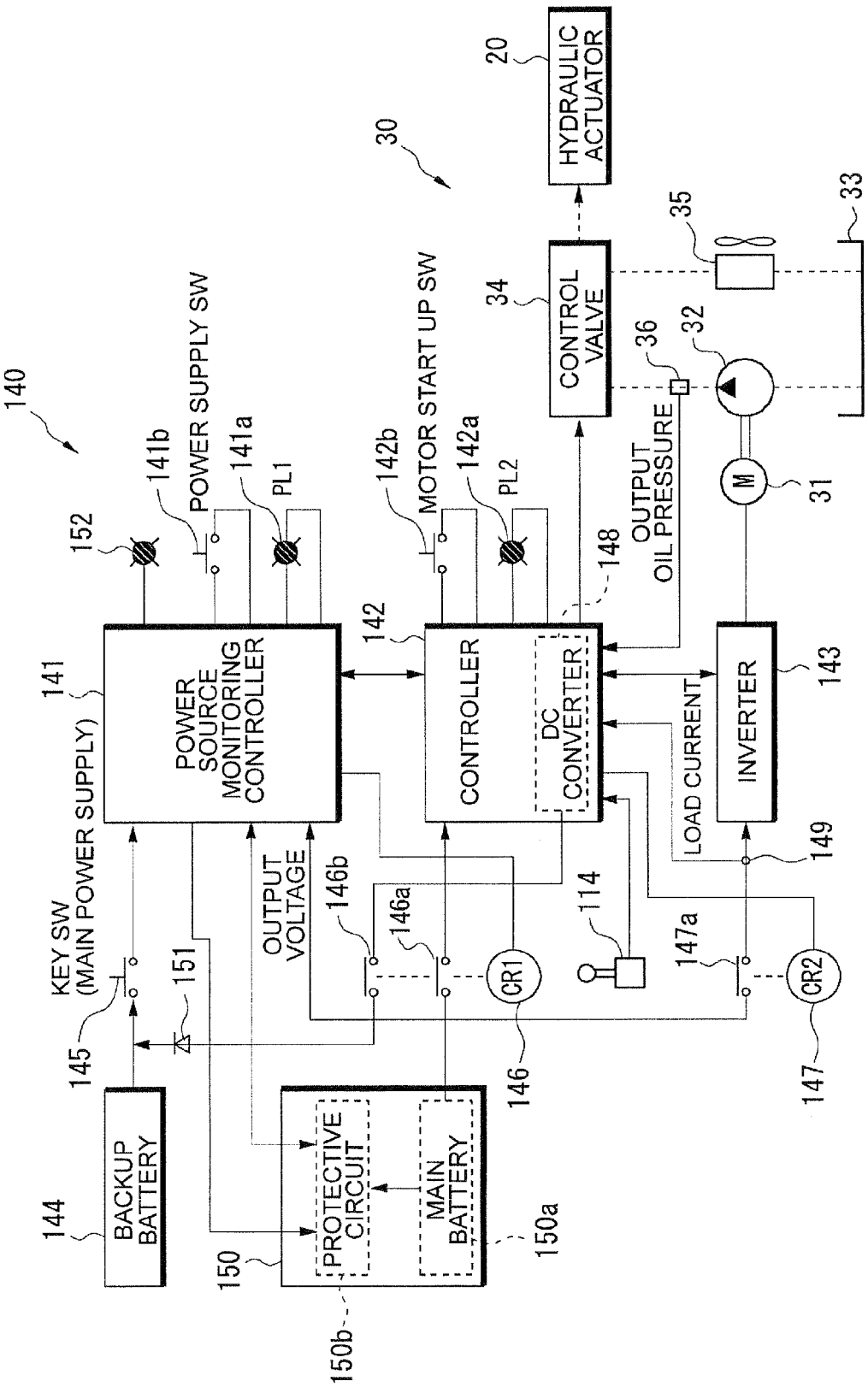
FIG. 10 is a block diagram showing the constitution of the hydraulic unit and power supply unit in a crawler type power shovel as an example of a working vehicle according to the second embodiment.

Next, a second embodiment will be explained with reference to FIGS. 10 through 12. The present embodiment is also applied to the crawler type power shovel 1 shown in FIG. 1, but to avoid duplication of explanation in the following, the same parts are given the same number and the same name, and their explanation has been omitted. Also, in FIG. 12, the symbol A enclosed in a circle after step S240 means move to connect to the symbol A enclosed within a circle immediately following the start.

The hydraulic unit 30 includes the electric motor 31, the hydraulic pump 32 that outputs hydraulic oil at a predetermined pressure and flow rate and that is driven by the electric motor 31, the tank 33 that stores hydraulic oil, the control valve (electromagnetic proportional valve) 34 that controls the supply of hydraulic oil output from the hydraulic pump 32 to the hydraulic actuator 20 in a supply direction and with a flow rate in accordance with its the manipulation of the operating device 14, an oil cooler 35 that cools the hydraulic oil whose temperature has risen, and so on. Operation signals output from the operating device 14 are input to a controller 142, which is explained later, and the controller 142 controls the control valve 34 by outputting command signals to the control valve 34 in accordance with the operation signals.

Direct current electric power supplied from the main battery unit 150 is converted into alternating current electric power having a predetermined voltage and frequency by an inverter 143 and supplied to the electric motor 31. A main battery unit 150 is constituted by a lithium ion battery, and includes a main battery 150a capable of outputting direct current high voltage (for example, direct current 336V), and a protective circuit 150b that obtains the status of and protects the main battery 150a.

Next, a power supply system 140 that supplies electrical power to the electric motor 31 using the main battery unit 150 is explained. The power supply system 140 includes an power source monitoring controller 141 that monitors the output voltage and status of the main battery unit 150, and a controller 142 that controls the inverter 143 and the control valve 34 to operate electric motor 31 and hydraulic actuator 20, as well as connecting and disconnecting the electric power supplied to the inverter 143.

In order to operate the power source monitoring controller 141 when starting the power shovel 1, the power supply system 140 includes a backup battery 144 that is constituted by a lithium ion battery that outputs a direct current voltage (for example, 12.6V direct current) for operating the power source monitoring controller 141, and the backup battery 144 and the power source monitoring controller 141 are connected and disconnected by a key switch (main power supply switch) 145 provided within the operator's cabin 15. The power source monitoring controller 141 supplies electric power from the backup battery 144 to the protective circuit 150b of the main battery unit 150, and obtains the status of the main battery 150a from the protective circuit 150b.

The main battery 150a of the main battery unit 150 is connected to and supplies electric power to the controller 142 and the inverter 143. The main battery 150a and the controller 142 are connected by a first contact point 146a of a first relay 146, so the connection between the main battery 150a and the controller 142 is made and broken by the first relay 146. Also, the main battery 150a and the inverter 143 are connected by a contact point 147a of a second relay 147, so the connection between the main battery 150a and the inverter 143 is made and broken by the second relay 147. The controller 142 includes a DC-DC converter 148 that converts high voltage direct current voltage supplied from the main battery 150a into a low voltage direct current voltage (the voltage for operating the power source monitoring controller 141), the output of the DC-DC converter 148 is connected between the backup battery 144 and the key switch 145 via a protective diode 151, in other words, connected to the power source monitoring controller 141 and the backup battery 144, and these connections are made and broken by a second contact point 146b of the first relay 146.

The first and second contact points 146a, 146b of the first relay 146 are opened and closed by the control of the controller 141. The first and second contact points 146a, 146b are normally maintained disconnected (OFF state), and when a voltage is applied to the first relay 146 from the power source monitoring controller 141 the first and second contact points 146a, 146b are turned ON, and when the contact point 146a and the contact point 146b are connected, the main battery 150a and the controller 142, as well as the DC-DC converter 148 and the power source monitoring controller 141 and a backup battery 144 are connected. When the second contact point 146b of the first relay 146 is connected, electric power is supplied to the DC-DC converter 148 by the power source monitoring controller 141, and the backup battery 144 is charged. Also, the contact point 147a of the second relay 147 is connected and disconnected by the control of the controller 142. The contact point 147a is normally in the disconnected state (OFF state), and when a voltage is applied to the second relay 147 from the controller 142 the contact point 147a is turned ON, the contact point 147a is connected, and the main battery 150a and the inverter 143 are connected.

The output values of a hydraulic pressure sensor 36 that measures the output pressure of the hydraulic pump 32 provided in the hydraulic unit 30, and the measured values of a current sensor 149 that measures the load current supplied to the inverter 143 from the main battery 150a are input to the controller 142. Also, the power source monitoring controller 141 includes a first pilot lamp 141a that indicates the ON state of the first relay 146, in other words, the state in which electric power is being supplied to the controller 142, and a power supply switch 141b that turns the first relay 146 ON when pressed while the first relay 146 is in the OFF state, and a warning pilot lamp 152 for notifying that a fault has arisen in the main battery unit 150. Further, the controller 142 includes a second pilot lamp 142a that indicates the ON state of the second relay 147, in other words, indicates that electric power is being supplied to the inverter 143, and a motor start up switch 142b which when pressed while the second relay 147 is in the OFF state turns the second relay 147 ON. The first and second pilot lamps 141a, 142a, the warning pilot lamp 152, the electric power switch 141b, and the motor start up switch 142b are disposed within the operator's cabin 15.

Figure 11:
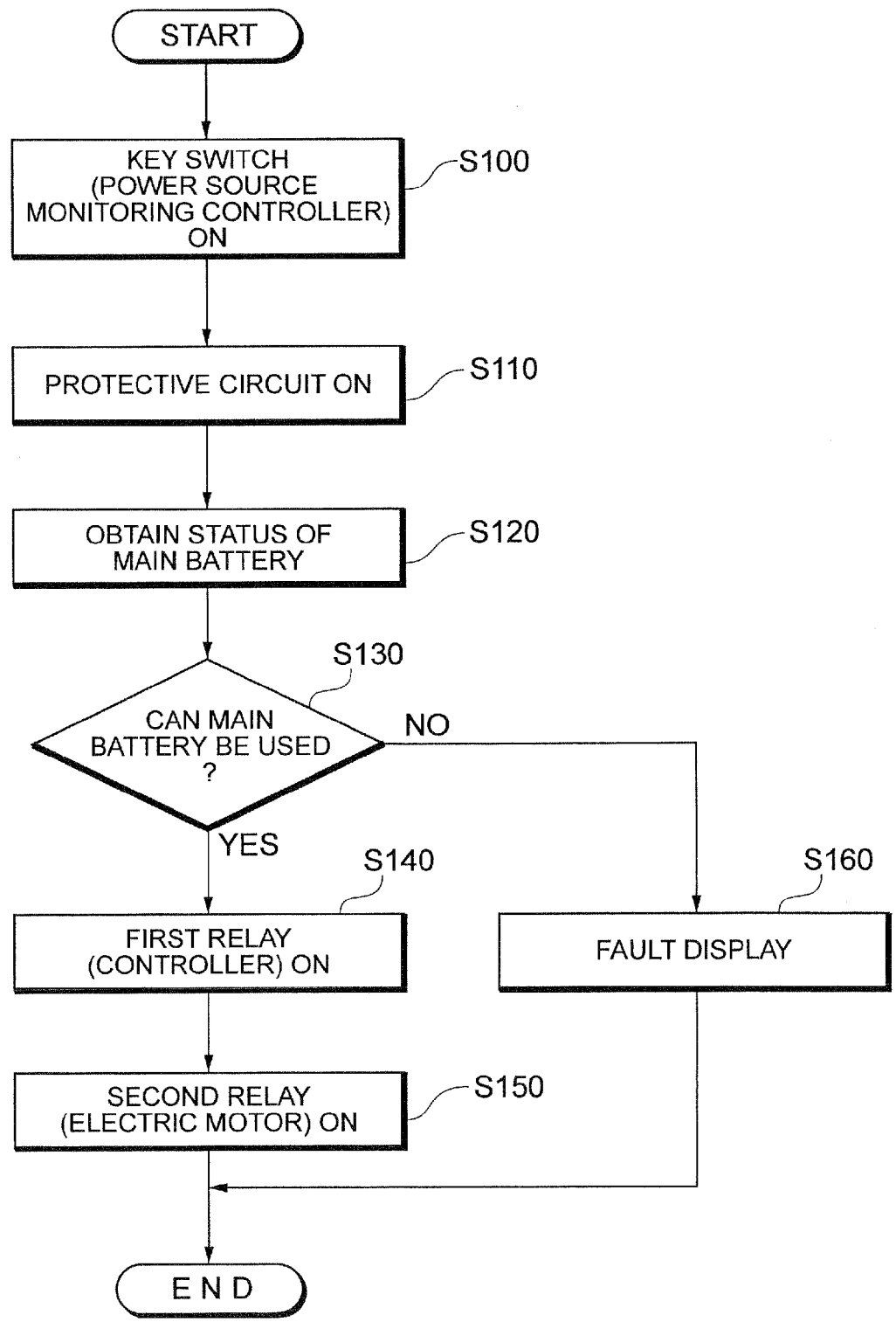
FIG. 11 is a flowchart showing the electric power startup process of the electric power unit.

Next, control of the electric power supply by the power supply system 140 is explained using FIG. 11. First, the power supply start up process is explained. When the operator positioned in the operator's cabin 15 turns on the key switch 145, which is disposed within the operator's cabin 15, electric power is supplied from the backup battery 144 to the power source monitoring controller 141, and the power source monitoring controller 141 starts up (step S100). The power source monitoring controller 141 first supplies electric power to the protective circuit 150b of the main battery unit 150 to start up the protective circuit 150b, and the protective circuit 150b starts to obtain the status of the main battery 150a (step S110). Then the power source monitoring controller 141 obtains the status of the main battery 150a from the protective circuit 150b (step S120), and determines whether the main battery 150a can be used or not (step S130). For example, if the main battery 150a is excessively discharged or the like, it is determined that the main battery 150a cannot be used, so the power source monitoring controller 141 lights the warning pilot lamp 152, and the power supply start up process is terminated (step S160).

On the other hand, when it is determined that the main battery 150a is in the normal state and can be used, the power source monitoring controller 141 turns the first relay 146 ON, and electric power is supplied from the main battery 150a to the controller 142, so the controller 142 is started, and the first pilot lamp 141a is lit (step S140). As stated above, when the first relay 146 is in the ON state, electric power is supplied from the DC-DC converter 148 to the power source monitoring controller 141 and the backup battery 144, and subsequently the power source monitoring controller 141 operates with electric power supplied from the DC-DC converter 148, and charging of the backup battery 144 starts.

Finally, when the controller 142 has started, the controller 142 turns the second relay 147 ON, electric power is supplied from the main battery 150a to the inverter 143, the inverter 143 is controlled to supply the electric motor 31 with alternating current electric power at a predetermined voltage and frequency, the electric motor 31 starts up, the second pilot lamp 142a is lit (step S140), and the electric power startup process of the power supply system 140 is terminated.

Figure 12:
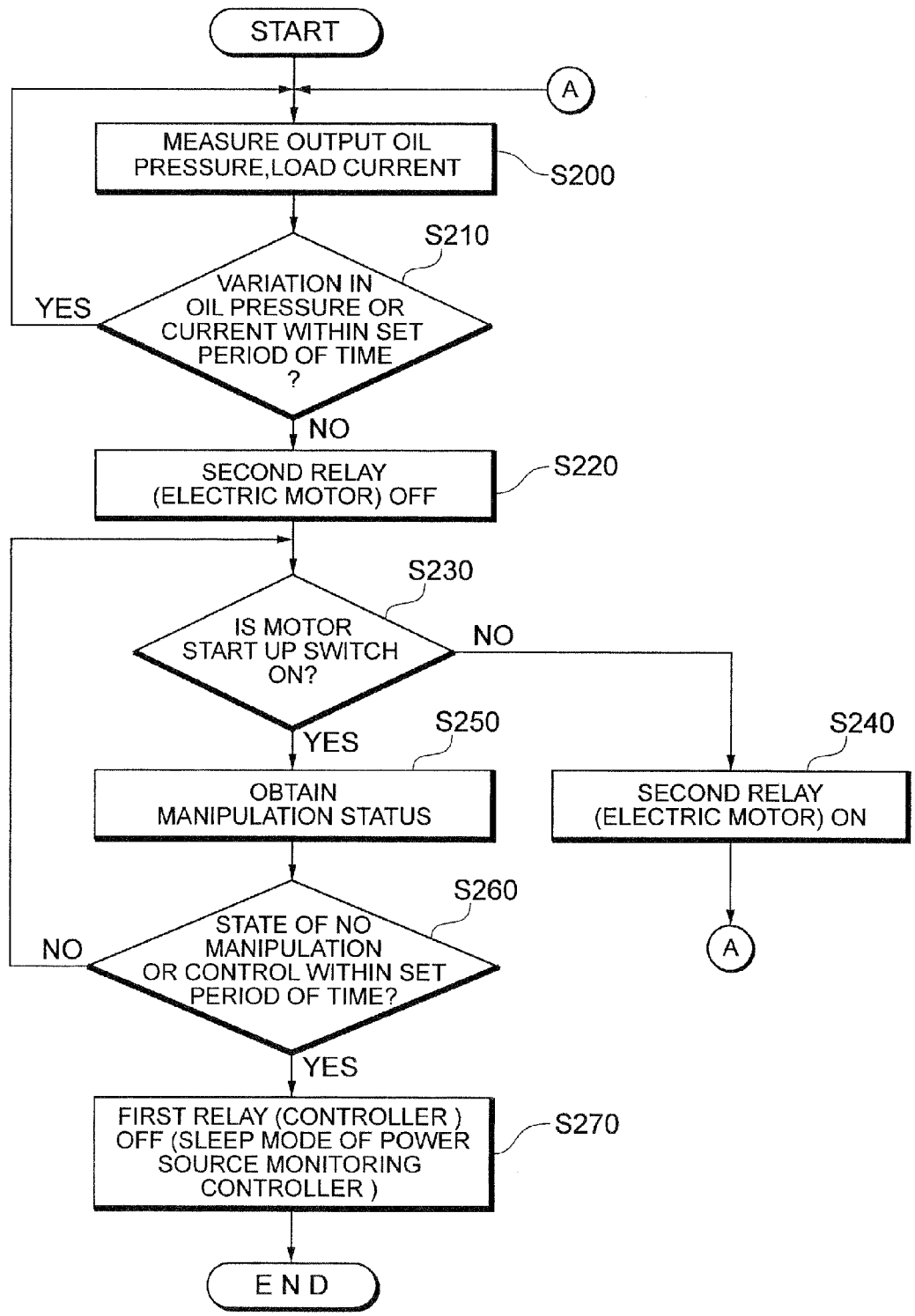
FIG. 12 is a flowchart showing the electric power saving control in the electric power unit.

Next, the electric power saving control by the power supply system 140 is explained using FIG. 12. The electric power saving control is a control to prevent waste of electric power in the charged main battery 150a when it is not necessary to supply hydraulic oil to the hydraulic actuator 20, by stopping the electric motor 31, and stopping the controller 142. FIG. 12 shows the control by the controller 142, and when the power supply start up process has terminated as described above, the electric power saving control is started.

The controller 142 measures the output oil pressure and the load current using the hydraulic pressure sensor 36 and the current sensor 149 (step S200). Then, it is determined whether within a set period of time (for example, five seconds) the output pressure or the load current have varied (step S210), if there is a variation, the procedure returns to step S200 and repeats this process. On the other hand, when there is no variation in the output pressure and the load current within the set period of time, the controller 142 turns the second relay 147 off, so the power supply to the inverter 143 is disconnected, the electric motor 31 stops, and the second pilot lamp 142a is turned off (step S220).

Next, the controller 142 determines whether the motor start up switch 142b is turned ON or not (step S230). When it is determined that the motor start up switch 142b is ON, the second relay 147 is turned ON, the electric motor 31 is started by supplying electric power to the inverter 143, and the second pilot lamp 142a is lit (step S240). Then, the procedure returns to step S200, and the above process is repeated. At step S230, when it is determined that the motor start up switch 142b is not on, the controller 142 obtains the state of manipulation of the operating device 14 or the like (step S250), determines whether within a set period of time there has been a state of no manipulation or control (step S260), and when there has not been a state of no manipulation or control the procedure returns to step S230 and this process is repeated.

At step S230, when it is determined that the state of no manipulation or control has continued during the set period of time, the controller 142 transmits a command signal to the power source monitoring controller 141 (step S270). Then, when the power source monitoring controller 141 receives the command signal from the controller 142, the first relay 146 is turned off, the electric power supply to the controller 142 is turned off and the controller 142 is stopped, first pilot lamp 141a is turned off, the electric power supply to the protective circuit 150b of the main battery unit 150 is stopped, and the sleep mode is activated.

When the sleep mode is activated, the power source monitoring controller 141 stops operation except for monitoring whether the power supply switch 141b has been pressed, so the electric power consumption of the backup battery 144 is minimized as much as possible. Then, when it is detected that the power supply switch 141b has been pressed, the power source monitoring controller 141 terminates the sleep mode, implements the process from step S110 in the power supply start up process shown in FIG. 11, the first and second relays 146, 147 are turned on, electrical power is supplied to the controller 142 and the inverter 143, and the electric motor 31 is started.

In this way, by providing the power source monitoring controller 141 that controls the supply of electric power to the inverter 143 separately from the controller 142, monitors the main battery unit 150, as well as controls the supply of electric power to the controller 142, and the backup battery 144 that allows the power source monitoring controller 141 to operate even when electric power is not supplied from the main battery unit 150, even if a fault arises in the main battery 150a, this fault is detected by the power source monitoring controller 141 and it is possible to provide a warning using the warning pilot lamp 152 or the like, so it is possible to make the operator that is operating the power shovel 1 immediately aware of the fault in the main battery unit 150.

The process when electric power is turned ON as described above is capable of turning on the power supply in turn starting with the power source monitoring controller 141, so it is possible to simplify the process and constitution of the power source monitoring controller 141 and the controller 142. Also, when electric power is supplied to the controller 142 when the main battery 150a is in a normal state, and at the same time the power source monitoring controller 141 is operated by the main battery 150a and the backup battery 144 is charged, if a fault arises in the main battery 150a, the power source monitoring controller 141 can be operated by the backup battery 144.

Further, the supply state of hydraulic oil to the hydraulic actuator 20 and the manipulation state of the operating device 14 are monitored by the controller 142, and when oil pressure is not necessary the electric power supply to the inverter 143 is stopped, and the electric power supply to the controller 142 is stopped, so unnecessary power consumption from the main battery 150a is minimized, and it is possible to lengthen the time that the power shovel 1 can carry out work without charging the main battery unit 150. Even when the power supply to the inverter 143 and the controller 142 is stopped in this way, by pressing the motor start up switch 142a or the power supply switch 141a, it is possible to supply electric power to the inverter 143 and the controller 142.

What is claimed is:

1. A working vehicle driven by a hydraulic actuator, comprising:
    a hydraulic pump that outputs hydraulic oil for operating the hydraulic actuator;
    an electric motor that drives the hydraulic pump;
    a main battery that supplies direct current electric power;
    an inverter that operates the electric motor by converting the direct current electric power from the main batter into alternating current electric power and supplying the alternating current electric power to the electric motor;
    an electric motor relay that makes and breaks the connection between the main battery and the inverter;
    a controller which is operated by direct current electric power from the main battery, and which controls the operation of the hydraulic actuator and the inverter, and makes and breaks the connection between the main battery and the inverter in use of the electric motor relay;
    a controller relay that makes and breaks the connection between the main battery and the controller;
    a power source monitoring controller that monitors the state of the main battery, and that makes and breaks the connection between the main battery and the controller in use of the controller relay;
    a backup battery that supplies electric power to the power source monitoring controller; and
    a key switch that makes and breaks the connection between the power source monitoring controller and the backup battery, wherein
    configuration is employed to execute:
    when the power source monitoring controller and the backup battery are connected by the key switch and the power sources monitoring controller is operating,
    a first step in which the power source monitoring controller obtains the state of the main battery and determines whether the main battery can be used or not;
    a second step in which the power source monitoring controller connects the main battery and the controller in use of the controller relay and starts up the controller when judgment is made in the first step that the main battery can be used; and
    a third step in which the controller starts the electric motor by connecting the inverter and the main battery in use of the electric motor relay.

2. The working vehicle according to claim 1, comprising a protective circuit that collects the status of the main battery, wherein
    in the first step, the power source monitoring controller supplies electric power to the protective circuit from the backup battery and starts up the protective circuit, and then obtains the status of the main battery from the protective.

3. The working vehicle according to claim 1, comprising warning means for warning that the main battery cannot be used, wherein
    in the first step, when determination is made that the main battery cannot be used, the power source monitoring controller issues a warning by the warning means.

4. The working vehicle according to claim 1, comprising a DC-DC converter for converting the direct current voltage of the main battery to the voltage for operating the power source monitoring controller, wherein
    the controller relay connects the main battery and the controller and connects the output of the DC-DC converter to the backup battery and the power source monitoring controller.

* * * * *